Patented May 4, 1954

2,677,701

UNITED STATES PATENT OFFICE 2,677,701

PREPARATION OF OCTADIENOLS

Joseph Donald Surmatis, Pompton Plains, and Benjamin Richard Juliano, Linden, N. J., assignors to Hoffmann-La Roche Inc., Nutley, N. J., a corporation of New Jersey No Drawing. Application June 19, 1952,
Serial No. 294,480

20 Claims. (Cl. 260—491)

This invention relates to the preparation of octadienols. More specifically the invention relates to the preparation of trans-2,6-dimethyl-2,6-octadien-8-ol and trans-2,6-dimethyl-1,6-octadien-8-ol. These are isomeric constituents of the perfume base nerol, and one object of the invention is the preparation of a mixture of trans-2,6-dimethyl-2,6-octadien-8-ol and trans-2,6-dimethyl-1,6-octadien-8-ol useful, for instance, in the perfume industry. Other and additional objects will be apparent from the following disclosure and claims.

Broadly, the invention provides a process wherein a 2,6-dimethyl-6-hydroxy-8-acyloxy-2-octene is reacted with a hydrohalic acid to produce a 2,6-dimethyl-2,6-dihalo-8-acyloxy-octane, and the latter is then treated to split out therefrom the elements of a hydrohalic acid. These steps of the invention can be illustrated by the following equations, wherein

represents the acyl radical of an organic carboxylic acid and —X represents the acid radical of a hydrohalic acid:

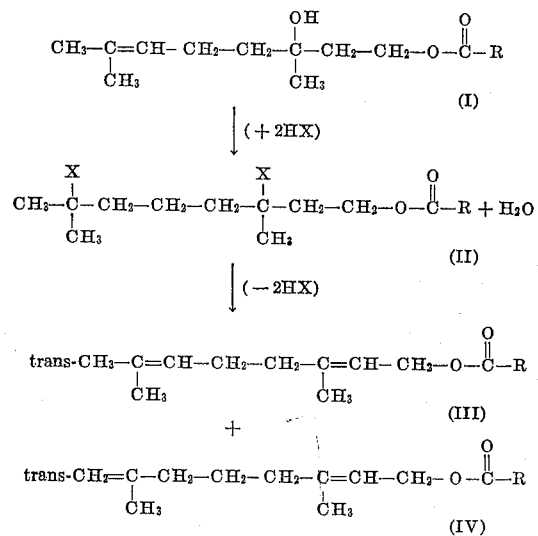

A comprehensive process incorporating the invention comprises esterifying 2,6-dimethyl-2-octene-6,8-diol (i. e. the known compound geraniol hydrate) at its terminal hydroxyl group with an organic carboxylic acid, treating the resulting 2,6-dimethyl-6-hydroxy-8-acyloxy-2-octene (I) with a hydrohalic acid HX so as to react two mols of the hydrohalic acid with each mol of (I) to produce the mixed ester (II), i. e. a 2,6-dimethyl-2,6-dihalo-8-acyloxy-octane, treating (II) to split out therefrom the elements of two mols of hydrohalic acid HX so as to produce a mixture of a trans-2,6-dimethyl-8-acyloxy-2,6-octadiene (III) and a trans-2,6-dimethyl-8-acyloxy-1,6-octadiene (IV), and hydrolyzing the latter mixture of esters, e. g. by conventional saponification procedures, to produce a mixture of trans-2,6-dimethyl-2,6-octadien-8-ol and trans-2,6-dimethyl-1,6-octadien-8-ol.

In a preferred embodiment of the invention R represents a hydrocarbon radical having no more than 10 carbon atoms, e. g. methyl, phenyl or naphthyl, and X represents chlorine, bromine or iodine. A preferred aspect of this embodiment is the case in which R is methyl and each X represents bromine.

Example 1

172 g. of 2,6-dimethyl-2-octene-6,8-diol was placed in a flask equipped with a stirrer, thermometer and dropping funnel. 500 cc. of petroleum naphtha ("Skelly-solve B") and 200 cc. of dimethylaniline were added to the flask and the contents were cooled to —10° C. by means of an acetone Dry-Ice bath. Then a solution of 79 cc. of acetyl chloride in 100 cc. of petroleum naphtha was added dropwise to the reaction mixture, while stirring, at such a rate that the internal temperature of the reaction mixture did not exceed —5° C. Two hours were required for the addition. At the end of this time, the cooling bath was removed and stirring was continued for two hours more. The reaction mixture was washed twice, each time with 500 cc. of water. The solvent was removed by distillation under water vacuum, and the residue was distilled under high vacuum. The product, 2,6-dimethyl-6-hydroxy-8-acetoxy-2-octene, distilled at 102°–105° C./0.5 mm., $n_D^{25}$=1.460.

In a one-liter, round-bottomed flask, fitted with a stirrer, thermometer and dropping funnel there was placed 53 g. of 2,6-dimethyl-6-hydroxy-8-acetoxy-2-octene. The flask was surrounded with a cooling bath and the contents cooled to —10° C. 200 cc. of a 30% w./w. solution of hydrogen bromide in glacial acetic acid was placed in a dropping funnel and added slowly while stirring. The internal temperature was not allowed to rise above +5° C. during the addition, which required 30 minutes. Stirring was continued for an additional 30 minutes at +5° C. One liter of water was then added and the mixture stirred for one minute. The layers were separated by means of a separatory funnel, and the oil layer was washed with 200 cc. of water. The product obtained, 2,6-dimethyl-2,6-dibromo-8-acetoxy-octane, was placed in a one-liter flask fitted with a stirrer, thermometer, condenser and a hot water bath. To this there were added 100 cc. of pyridine and 100 cc. of toluene and the reaction mixture was stirred at 95°–100° C. for two hours. At the end of this period, the reaction mixture was cooled to room temperature and washed twice with 500 cc. of water. The toluene was distilled off at 100 mm. and the residue was fractionated under high vacuum. There was obtained a mixture of trans-2,6-dimethyl-8-acetoxy-2,6-octadiene and trans-2,6-dimethyl-8-acetoxy-1,6-octadiene, distilling at 88° C. at 2 mm.; $n_D^{25} = 1.457$.

In a 500 cc. flask fitted with a mechanical stirrer there was placed 20 g. of the above product mixture of esters, together with 100 cc. of 95% ethyl alcohol. 10 g. of potassium hydroxide was dissolved in 20 cc. of water and poured into the reaction flask. The solution was stirred at 40°–50° C. for two hours, then diluted with 500 cc. of water. The oil layer was separated and the aqueous portion was extracted twice with 200 cc. of petroleum ether, and the extract was added to the oil layer. After washing the combined oil layer-extract neutral with water, the solvent was removed by distillation. The resulting mixture of trans - 2,6 - dimethyl - 2,6 - octadien - 8 - ol and trans-2,6-dimethyl-1,6-octadien-8-ol distilled at 75° C. at 1 mm.; $n_D^{25} = 1.472$–1.474.

Example 2

In a 500 cc. cylinder fitted with an inlet tube extending to the bottom of the cylinder, there was placed 53 g. of 2,6-dimethyl-6-hydroxy-8-acetoxy-2-octene and 200 cc. of glacial acetic acid. The contents were cooled to +15° C. and gaseous hydrogen iodide was bubbled in until there was a weight increase of 90 g. The mixture was diluted with one liter of water, and the oil layer (2,6-dimethyl-2,6-diiodo-8-acetoxy-octane) which settled to the bottom was removed by means of a separatory funnel and quickly transferred to a one-liter flask containing 100 cc. of pyridine and 100 cc. of toluene. The mixture was stirred at 95°–100° C. for one hour. The flask was cooled to room temperature with a cold water bath, and the product was washed twice with 500 cc. of water. The product obtained, a mixture of trans-2,6-dimethyl-8-acetoxy-2,6-octadiene and trans-2,6-dimethyl-8-acetoxy-1,6-octadiene, distilled at 88°–90° C. (2 mm.); $n_D^{25} = 1.458$. On saponification by the procedure of Example 1, a mixture of trans-2,6-dimethyl-2,6-octadien-8-ol and trans-2,6-dimethyl-1,6-octadien-8-ol was obtained.

Example 3

In a 500 cc. cylinder, there was placed 106 g. of 2,6-dimethyl-6-hydroxy - 8 - acetoxy-2-octene together with 200 cc. of methylene chloride. The solution was cooled to −10° C. and gaseous hydrogen chloride was bubbled through the solution until a weight increase of 36 g. was obtained. The reaction mixture was then placed in a separatory funnel and shaken with 200 cc. of concentrated hydrochloric acid. The aqueous layer was removed and the oil layer was washed with 500 cc. of water. The oil layer (2,6-dimethyl-2,6-dichloro-8-acetoxy-octane) was then placed in a 500 cc. flask with 200 cc. of pyridine and 200 cc. of toluene. The flask was fitted with a condenser for distillation and the methylene chloride was distilled off. The condenser was then fixed for reflux and the reaction mixture was heated, while stirring, at 90°–95° C. for six hours. The flask was cooled to room temperature by allowing to stand overnight, and the reaction mixture was washed twice with 500 cc. of water. By fractionation of the product, a mixture of trans-2,6-dimethyl-8-acetoxy-2,6-octadiene and trans-2,6-dimethyl-8-acetoxy-1,6-octadiene boiling at 87°–90° C. (2 mm.) was obtained. Saponification by the procedure of Example 1 yielded a mixture of trans - 2,6 - dimethyl-2,6-octadien - 8 - ol and trans-2,6-dimethyl-1,6-octadien-8-ol.

Example 4

100 g. of 2,6-dimethyl-2-octene-6,8-diol was placed, together with 400 cc. petroleum ether ("Skelly-solve B") and 150 cc. pyridine, in a 1-liter flask fitted with a stirrer, thermometer, and dropping funnel. The contents of the flask were cooled to −5° C. 81 g. of benzoyl chloride was added dropwise to the reaction mixture in one hour while maintaining a temperature of 0° to −5° C. At the end of this time the cooling bath was removed and stirring continued for an additional two hours. The reaction mixture was washed twice, each time with 250 cc. of water. After removing the solvent under water vacuum, the residue was distilled under high vacuum. The product, 2,6-dimethyl-6-hydroxy-8-benzoyloxy-2-octene, distilled at 160°–165° C./0.2 mm.

50 g. of 2,6-dimethyl-6-hydroxy-8-benzoyloxy-2-octene was placed in a flask fitted with a stirrer, thermometer and dropping funnel. The flask was surrounded with a cold bath and the contents cooled to −5° C. 138 g. of a 32% w./w. solution of hydrobromic acid in glacial acetic acid, cooled to −5° C., was added from the dropping funnel in five minutes, keeping the temperature below +5° C. Stirring was continued for thirty minutes more, allowing the temperature to rise to 20° C. At the end of this time, 500 cc. of water was added and the reaction mixture was stirred for one minute. The layers were separated and the oil layer washed twice, each time with 250 cc. of water. The product obtained, 2,6-dimethyl-2,6-dibromo-8-benzoyloxy-octane, was transferred to a one-liter flask fitted with a stirrer, thermometer and condenser. 100 cc. of pyridine and 200 cc. of toluene were added and the reaction mixture was stirred at 95°–100° C. for two hours. After cooling to room temperature, the reaction mixture was washed twice, each time with 250 cc. of water. The solvent was removed under vacuum and the residue distilled. There was obtained a mixture of trans-2,6-dimethyl-8-benzoyloxy-2,6-octadiene and trans-2,6-dimethyl-8-benzoyloxy-1,6-octadiene, distilling at 135°–140° C./0.2 mm. Saponification by the procedure of Example 1 gave a mixture of trans-2,6-dimethyl-2,6-octadien-8-ol and trans-2,6-dimethyl-1,6-octadien-8-ol.

We claim:
1. A mixed ester of the formula

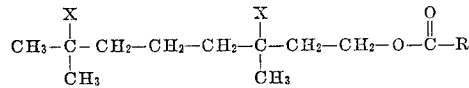

wherein R represents a hydrocarbon radical having no more than 10 carbon atoms and —X represents the acid radical of a hydrohalic acid.

2. A mixed ester of the formula $$CH_3-\underset{\underset{CH_3}{|}}{\overset{\overset{X}{|}}{C}}-CH_2-CH_2-CH_2-\underset{\underset{CH_3}{|}}{\overset{\overset{X}{|}}{C}}-CH_2-CH_2-O-\overset{\overset{O}{\|}}{C}-R$$

wherein R represents a hydrocarbon radical having no more than 10 carbon atoms and —X represents a halogen selected from the group consisting of chlorine, bromine and iodine.

3. A compound according to claim 2 wherein each X represents chlorine.

4. A compound according to claim 2 wherein each X represents bromine.

5. A compound according to claim 2 wherein each X represents iodine.

6. 2,6 - dimethyl-2,6-dichloro - 8 - acetoxy - octane.

7. 2,6 - dimethyl - 2,6 - dibromo-8-acetoxy-octane.

8. 2,6-dimethyl-2,6-diiodo-8-acetoxy-octane.

9. A process which comprises reacting a 2,6-dimethyl-6-hydroxy-8-acyloxy - 2 - octene with a hydrohalic acid to produce a 2,6-dimethyl-2,6-dihalo-8-acyloxy-octane and splitting out from the latter the elements of a hydrohalic acid by heating in the presence of an acid acceptor; the 8-acyloxy radical being one which has directly attached to the carbonyl group a hydrocarbon radical having no more than 10 carbon atoms.

10. A process which comprises reacting a 2,6-dimethyl-6-hydroxy-8-acyloxy-2-octene with a hydrohalic acid to produce a 2,6-dimethyl-2,6-dihalo-8-acyloxy-octane; the 8-acyloxy radical being one which has directly attached to the carbonyl group a hydrocarbon radical having no more than 10 carbon atoms.

11. A process according to claim 10 wherein the hydrohalic acid is hydrochloric acid.

12. A process according to claim 11 wherein the 8-acyloxy substituent is acetoxy.

13. A process according to claim 10 wherein the hydrohalic acid is hydrobromic acid.

14. A process according to claim 13 wherein the 8-acyloxy substituent is acetoxy.

15. A process according to claim 10 wherein the hydrohalic acid is hydriodic acid.

16. A process according to claim 15 wherein the 8-acyloxy substituent is acetoxy.

17. A process which comprises splitting out the elements of a hydrohalic acid from a 2,6-dimethyl-2,6-dihalo-8-acyloxy-octane by heating in the presence of an acid acceptor; the 8-acyloxy radical being one which has directly attached to the carbonyl group a hydrocarbon radical having no more than 10 carbon atoms.

18. A process according to claim 17 wherein 2,6-dihalo is 2,6-dichloro.

19. A process according to claim 17 wherein 2,6-dihalo is 2,6-dibromo.

20. A process according to claim 17 wherein 2,6-dihalo is 2,6-diiodo.

No references cited.